United States Patent [19]

Uchiyama

[11] Patent Number: 4,538,160

[45] Date of Patent: Aug. 27, 1985

[54] INK JET RECORDING APPARATUS

[75] Inventor: Tadamitsu Uchiyama, Yokohama, Japan

[73] Assignee: Minolta Camera Kabushiki Kaisha, Osaka, Japan

[21] Appl. No.: 457,395

[22] Filed: Jan. 12, 1983

[30] Foreign Application Priority Data

Jan. 26, 1982 [JP] Japan .............................. 57-10381

[51] Int. Cl.³ ...................... G01D 15/18; H04N 1/46

[52] U.S. Cl. .............................. 346/140 R; 346/75; 358/75

[58] Field of Search ................ 346/1, 135.1, 140 PD, 346/75; 358/75

[56] References Cited

U.S. PATENT DOCUMENTS

| | | | |
|---|---|---|---|
| 3,404,221 | 10/1968 | Loughren | 346/75 UX |
| 3,416,153 | 12/1968 | Hertz et al. | 346/75 |
| 3,916,421 | 10/1975 | Hertz | 346/75 |
| 4,046,074 | 9/1977 | Hochberg et al. | 346/135.1 |
| 4,178,597 | 12/1979 | Isayama et al. | 358/75 X |
| 4,367,482 | 1/1983 | Heinzl | 346/140 PD |

*Primary Examiner*—George H. Miller, Jr.
*Attorney, Agent, or Firm*—Wenderoth, Lind & Ponack

[57] ABSTRACT

An ink jet recording apparatus comprises an ink jetting nozzle for jetting a colored ink to deposit on a recording paper and a liquid jetting nozzle for jetting a processing liquid to deposit on the recording paper. Depending on the type of the processing liquid, the deposits of the processing liquid may be formed on the recording paper in either overlaying or overlaid relation to the deposits of the colored ink.

7 Claims, 4 Drawing Figures

INK JET RECORDING APPARATUS

BACKGROUND OF THE INVENTION

The present invention relates to an ink jet recording apparatus for jetting liquid ink, by the application of pressure or voltage, towards a recording medium to delineate a desired image.

Various types of ink jet recording apparatuses have hitherto been suggested and, in general, they all have the following common drawbacks:

(1) One or more ink jetting nozzles are susceptible to ink clogging.

(2) The response to an image signal applied is so low as to hamper the high speed recording.

(3) Complicated procedures are required to recover unnecessary ink.

(4) The concentration and the saturation of the delineated image tend to be short of the requirements.

(5) The image permanency, represented by, for example, the light resistance and the water resistance, is insufficient.

Although various attempts have been made to substantially eliminate these drawbacks, none of them has been successful in view of the fact that elimination of one or some of the drawbacks resulted in enhancement of the other drawback or drawbacks. By way of example, while the use of ink of low viscosity is desirable for the response to be increased, it results in the use of the reduced amount of dyestuff and resin, which in turn result in the reduced image permanency with the reduced concentration and saturation of the delineated image. In the case with an on-demand type, no unnecessary ink is produced, but the response is undesirably low. On the other hand, an attempt has also been made to apply to the recording medium an image improver and/or a modifier for increasing the image permanency for the purpose of substantially eliminating the above described drawbacks, and this technique is found to have such a disadvantage as to result in the recording medium having a poor ink retention property.

SUMMARY OF THE INVENTION

Accordingly, the present invention has been developed in view of the foregoing and has as an essential object to provide an improved ink jet recording apparatus which is effective to substantially eliminate all of the previously discussed drawbacks without adversely affecting the ink retention property of the recording medium.

In order to accomplish this and other objects of the present invention, the ink jet recording apparatus to which the present invention is applied is so designed that a desired image can be delineated at a predetermined location on the recording medium with jetted ink deposited at such predetermined location in a manner such that there is superimposed therein a processing liquid. The processing liquid may be applied prior to and/or subsequent to the application of the ink. Depending on the nature of the processing liquid to be used, deficiencies inherent in the ink can be compensated for in such a way as to improve the quality of the image, the image permanency and other characteristics.

BRIEF DESCRIPTION OF THE DRAWINGS

This and other objects and features of the present invention will become clear from the following detailed description of a preferred embodiment thereof given with reference to the accompanying drawings, in which.

DETAILED DESCRIPTION OF THE EMBODIMENT

Figure 1:
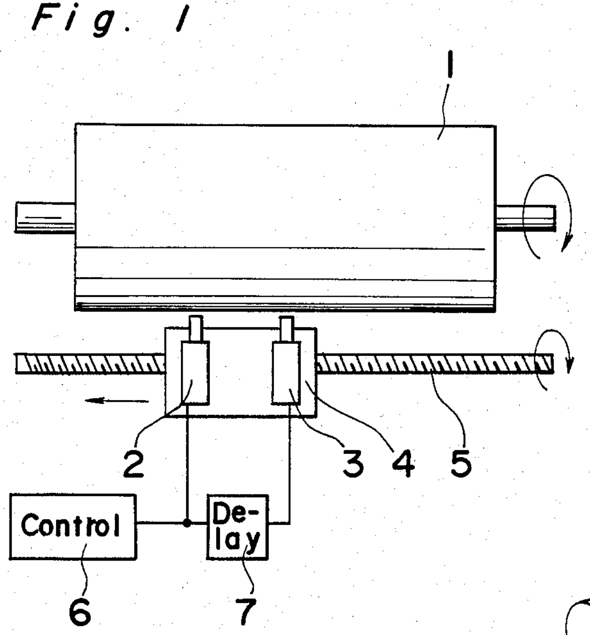
FIG. 1 is a schematic plan view of an ink jet recording apparatus which may be used in the practice of the present invention.

Before the description of the present invention proceeds, it is to be noted that like parts are designated by like reference numerals throughout the accompanying drawings.

Figure 2:
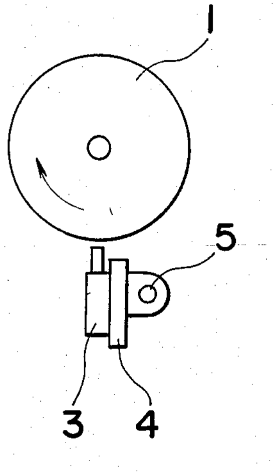
FIG. 2 is a schematic side view of the apparatus shown in FIG. 1.

Referring first to FIGS. 1 and 2, there is illustrated an ink jet recording apparatus of the facsimile type which comprises a support drum 1 supported for rotation in a clockwise direction as viewed in FIG. 2 (in a scanning direction), and a carriage 4 having an ink jetting nozzle 2 and a liquid jetting nozzle 3 mounted thereon for movement together therewith, the carriage being drivingly mounted on a screw shaft 5 which, when rotated, drives the carriage reciprocally in a direction parallel to the axis of rotation of the drum 1 (in a sub-scanning direction). The nozzles 2 and 3 are of an on-demand type.

When recording is desired to be performed, a recording paper is placed over the support drum 1, and the carriage 4 with the nozzles 2 and 3 thereon is made to move leftwards as viewed in FIG. 1. During the movement of the carriage 4, the jetting of ink and processing liquid respectively from the nozzles 2 and 3 to delineate a desired image is controlled by an image signal controller 6, the output to be applied from the controller 6 to the nozzle 3 being fed through a delay circuit 7. The delay circuit 7 has a delay time equal to the length of time required for the liquid jetting nozzle 3 to move a distance equal to the distance of spacing, i.e., the pitch, between the nozzles 2 and 3, so that the processing liquid jetted from the nozzle 3 can overlap and cover up the delineated trace of ink on the recording paper which has been formed by jetting the ink from the ink jetting nozzle 2. The delay time of the delay circuit 7 is preferably within the range of about 0.5 to 2 seconds, and this delay time range has been found to pose no problem in most situations for the reason discussed below.

Assuming that the support drum 1 is rotated at a peripheral velocity of 5 m/sec., about one second is required for an ordinary ink (containing 10 to 20 wt% humectant) jetted onto the recording paper to assume an apparently dried state if the recording paper used is a high quality standard paper such as a PPC paper, about 0.5 to 1.0 second is required if the recording paper used is a coated paper for jet recording purposes which has a white, high water absorbent layer ("IJ Mat Coat Paper" manufactured and sold by Mitsubishi Seishi K.K. of Japan), about 3 to 5 seconds is required if the recording paper used is an art paper for printing purposes, and about 10 seconds is required if the recording paper so used is a non-absorbent sheet such as, for example, a film. (These time values are measured per equal amount of ink deposit.) On the other hand, the carriage with the ink and liquid jetting nozzles thereon is intermittently moved at intervals of 0.2 mm, the delay time will be substantially one second at the time of completion of 20 complete rotations of the drum and, therefore, if the time required to dry is one second, the ink and liquid jetting nozzles are required to be displaced a distance of $0.2 \times 20 = 4$ mm from each other in a direction parallel to the axis of rotation of the drum.

Thus, the displacement of 5 to 10 mm is generally sufficient and, in that case, the delay time is within the range of about 0.5 to 2 seconds, thereby posing no practical problem.

When the image is depicted by applying deposits of the processing liquid over the deposits of the ink in the manner described above, the deposits of the processing liquid will form, for example, protective layers over the ink deposits, thereby compensating for deficiencies of the ink used. Where the ink is a water-soluble colored liquid, the water resistance of the ink deposits can be imparted by the deposits of the processing liquid overlaying such ink deposits. In addition, although the saturation of the ink will, when the ink contains no vehicle such as resin, be reduced to such an extent as may result in reduced grainess, the deposits of the processing liquid overlaying the ink deposits serve to increase the saturation and the lightness. Moreover, if the ink is applied by properly adjusting the solubility of both of the recording ink and the processing liquid, the concentration of the delineated image can be increased, and a similar effect can also be obtained by making use of the drying condition of the ink.

By way of example, where the recording ink is a water soluble colored ink, the processing liquid may be an alcohol solution containing alcohol-soluble natural resin (for example, rosin, shellac or dammar gum) or alcohol-soluble synthetic resin (for example, silicone or acryl) and the use of such processing liquid is effective to increase the concentration of the delineated image when overlaid on the ink deposits forming the delineated image. Where the drying condition is used to give a similar effect, the processing liquid may be an aqueous solution containing a resin which exhibits water solubility, but a water insolubility when dried, for example, emulsion-alkali soluble alkydresin or any one of a number of water soluble resins (including gelatine, polyvinyl alcohol and polyvinyl pirrolidone).

A specific example effective to increase the water resistance of the image delineated by the use of the aqueous ink is as follows:

| | |
|---|---|
| Recording Ink (Water-soluble, Colored) | |
| Dyestuff: Direct Deep Black GX | 3 wt % |
| Humectant: Glycerine | 10 wt % |
| Antifugal Agent: 2,4-dimethyl-1,3 dioxane | 0.1 wt % |
| pH Buffer: Monoethanolamine | 3 wt % |
| Water: | Residue |
| Processing Ink (Oil-soluble) | |
| Acrylic acid methylester resin | 20 wt % |
| Ethyl acetate | 80 wt % |

Where the light resistance of the delineated image is additionally desired to be increased, the processing liquid of the above described composition may contain an ultraviolet stabilizer (for example, 2,4 dihydroxybenzophenone), antioxidant and others.

In the apparatus shown in FIGS. 1 and 2, the positions of the nozzles 2 and 3 may be reversed relative to to each other. If the nozzles 2 and 3 are reversed, it is possible to deposit the processing liquid the first thing on the recording paper in the position of the image to be delineated, and then to deposit the recording ink over the deposit of the processing liquid. This method of applying the recording ink to the recording paper so as to overlay the deposits of the processing liquid is advantageous in that both the fixing property and the permeation of the recording ink on the recording paper can be adjusted by the processing liquid and that recording can be done on any non-absorbent material such as, for example, metal, resin film or the like.

More specifically, where the recording is desired to be made on a non-absorbent material such as metal or ceramics, the use of the processing liquid which is an alcohol solution of partially or completely saponified polyvinyl alcohol is effective to achieve a high speed recording with water soluble recording ink which has not hitherto been used on non-absorbent material.

It is to be noted that the application of the processing liquid onto the recording paper may be effected two times, i.e., before and after the application of the recording ink. In this case, both of the effects given by the application of the processing liquid before the application of the recording ink and those given by the application of the processing liquid after the application of the recording ink can be simultaneously achieved.

In the first mentioned method wherein the processing liquid is deposited over the deposits of the recording ink, an arrangement may be made to detect, by means of, for example, a photoelectric sensor, the presence or absence of an image (deposits of the recording ink) on the recording paper and then to jet or spray the processing liquid from the nozzle onto only the area of the recording paper where the image is depicted. In this case, the recording paper on which the image has been depicted with the recording ink has to be removed from the recording apparatus and then to be placed in another recording device for the application of the processing liquid.

Figure 3:
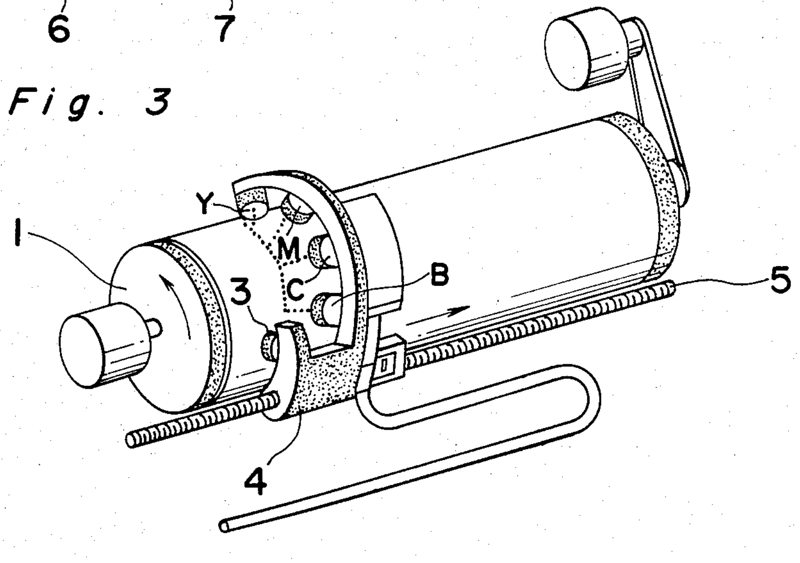
FIG. 3 is a perspective view of another ink jet recording apparatus which may also be used in the practice of the present invention.

FIG. 3 illustrates another ink jet recording apparatus utilizeable for the practice of another embodiment of the present invention. So far as shown in FIG. 3, the carriage 4 drivingly mounted on the screw shaft 5 carries, in addition to the liquid jetting nozzle 3, ink jetting nozzles Y, M, C and B for jetting respective inks of different colors, for example, yellow, magenta, cyan and black. The apparatus is so designed that, while the carriage 4 is moved rightwards as viewed in FIG. 3 by the rotation of the shaft 5, the inks of different colors are suitably jetted from the associated nozzles Y, M, C and B onto the recording paper to depict an image which is in turn covered up by deposits of the processing liquid jetted from the liquid jetting nozzle 3.

Figure 4:
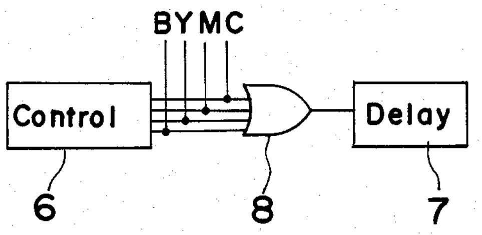
FIG. 4 is a circuit block diagram showing a circuit for the apparatus shown in FIG. 3.

In this apparatus of FIG. 3, outputs from the image signal controller 6 are applied to the nozzles Y, M, C and B on the one hand and on the other hand through an OR gate 8 to the delay circuit 7 of the type described with reference to FIG. 1 to control the jetting of the processing liquid from the nozzle 3 as shown in FIG. 4. It is to be noted that the number of the liquid jetting nozzle 3 need not be limited to one such as shown, but may be increased to an appropriate number to enable the processing liquid to be used depending on the characteristics of each of the inks of different colors.

| | |
|---|---|
| Recording Ink | |
| Dyestuff: Brilliant Blue FCF | 3 wt % |

-continued

| | |
|---|---|
| Humectant: Ethylene glycol | 20 wt % |
| Buffer: Phthalic acid | 1 wt % |
| Antifugal Agent: Sodium Propionate | 0.2 wt % |
| Water: | Residue |
| Processing Liquid | |
| Resin: Maleic acid resin (modified by rosin) | 10 wt % |
| Solvent: Ethylene glycol monoethyl ether | 90 wt % |

This example is applicable where the image is to be recorded on a hydrophobic plastic film, such as a polyester film, with the use of, for example, an aqueous ink suited for use in high speed recording, and the processing liquid contains a water soluble organic solvent which is ethylene glycol monoethyl ester as hereinabove listed.

Although the image is depicted by depositing droplets of the aqueous ink on the plastic film, which normally results in aggregation of the ink droplets, this drawback can be substantially eliminated by applying the processing liquid to the plastic film in advance of the application of the ink, the ink being subsequently applied before the deposits of the processing liquid completely dry so that the deposits of the ink can mix up with the deposits of the processing liquid thereby to increase both the luminous concentration and the fixing property.

Since the recording ink generally requires the use of a proper nozzle in order to attain such requirements as the image must satisfy, such as the resolution, the response and the concentration, the use of a combination of any known nozzle of the voltage excited type, ultrasonic pressure excited type, on-demand pressure excited type or on-demand voltage excited type with a proper exciting system is desirable. On the contrary, the liquid jetting nozzle has no requirements such as the resolution, the response and the sharpness of the delineated image and may have a relatively rough performance provided that the processing liquid can be jetted onto the recording medium so as to overlap the deposits of the recording ink, and the liquid jetting nozzle may, therefore, be a simple type, preferably, an on-demand type which can be operated by the pumped pressure to jet the processing liquid.

From the foregoing full description of the present invention, it has now become clear that, since the present invention is such that the image can be delineated at a predetermined location with the recording ink superimposed on the processing liquid, the quality, the image permanency, and the development of the image can advantageously be improved by the processing liquid applied whereas the recording ink permits the ink jet recording apparatus to exhibit particular performance, that is, those associated with the reduced viscosity and the response, the consequence of which is the elimination of the possible occurrence of clogging, the facilitation of high speed recording, and the attainment of a high quality image and the high durability of the image. Where the processing ink is applied to the recording medium as a fixing property improver prior to the formation of the ink deposits on the same recording medium, the recording can be done on a non-absorbent material. Moreover, since the processing liquid is applied only to the areas of the recording medium where the image is desired to be depicted, the property of the remaining areas of the recording medium making it usable for writing will not be reduced.

Although the present invention has fully been described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

I claim:

1. An ink jet recording apparatus which comprises, in combination:

a plurality of first nozzles for respectively jetting different colored inks towards a recording medium being moved in a scanning direction, said first nozzles being adapted to receive image signals independently of each other while the first nozzles are moved in a sub-scanning direction relative to the recording medium thereby to record an image on the recording medium;

a second nozzle device provided separately of, and spaced a predetermined distance from, the first nozzles for jetting a processing liquid, containing a preselected processing material, onto the recording medium only in an area substantially corresponding to the area in which colored ink is jetted by said first nozzles; and a control device for applying the image signals at different times to the respective first nozzles and to said second nozzle devices such that the colored inks and the processing liquid are respectively deposited on the recording medium in superimposed relation to each other, said control device being operable to produce a logical product of the image signals associated with the colored inks of different colors.

2. An apparatus as claimed in claim 1, wherein the control device has a delay circuit having a delay time corresponding to the spacing between the first nozzles and said second nozzle device such that the image signal is applied to one of the first nozzles and second nozzle device while the other of the first nozzles and second nozzle device receives the image signal after the passage of a time equal to the delay time.

3. An apparatus as claimed in claim 1, wherein the preselected processing material is an improver for increasing the ink retentive property, and wherein said control device is operable to cause the second nozzle device to jet the processing liquid prior to the jetting of the colored ink from the first nozzles.

4. An apparatus as claimed in claim 1, wherein the preselected processing material is one of an agent for improving the image quality and an agent for improving the keeping property of the colored ink, and wherein said control device is operable to cause the second nozzle device to jet the processing liquid subsequent to the jetting of the colored ink.

5. An ink jet recording apparatus, comprising, in combination:

a plurality of first nozzles for respectively jetting different colored inks towards a recording medium being moved in a main scanning direction;

means for supplying image signals to said first nozzles independently of each other for controlling the jetting of colored inks therefrom;

means connected to said first nozzles for moving said first nozzles in a sub-scanning direction relative to the recording medium to cause an image to be recorded on the recording medium with particles of the colored ink;

a second nozzle device spaced in said sub-scanning direction a predetermined distance from said first nozzles for jetting a processing liquid containing a preselected material onto the recording medium only in an area substantially corresponding to the area in which colored ink is jetted by said first nozzles;

means supplying said processing liquid to said second nozzle device;

means connected to said second nozzle device for moving said second nozzle device in the sub-scanning direction relative to the recording medium at the same speed and in the same direction as said first nozzles;

a delay means for determining a delay time corresponding to the predetermined distance between said first nozzles and said second nozzle device and the speed of movement of the nozzles and nozzle device in the sub-scanning direction; and a control means connected to said image signal supply means and said delay means and said nozzles and nozzle device for inputting the image signal to one of said nozzles and said nozzle device through said delay means for causing the particles of the processing liquid jetted from said second nozzle device to be deposited on the same area of the recording medium on which the particles of colored ink are deposited, said control device being operable to produce a logical product of the image signals associated with the colored inks of different colors.

6. An apparatus as claimed in claim 5 wherein said means for supplying the processing liquid comprises means for supplying a processing liquid having therein as a preselected material an improver for increasing the ink retentative property, and said second nozzles precedes said first nozzle device in the direction of movement, and wherein said control means supplies the image signal to said first nozzles through said delay means.

7. An apparatus as claimed in claim 5 wherein said means for supplying the processing liquid comprises means for supplying a processing liquid having therein as a preselected material an improver for increasing the ink retentative property, and said second nozzles follows said first nozzle device in the direction of movement, and wherein said control means supplies the image signal to said second nozzle device through said delay means.

* * * * *